(12) United States Patent
Schloming

(10) Patent No.: US 8,612,468 B2
(45) Date of Patent: Dec. 17, 2013

(54) SYSTEM AND METHOD FOR RETRIEVING DATA FROM A RELATIONAL DATABASE MANAGEMENT SYSTEM

(75) Inventor: Rafael H. Schloming, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1413 days.

(21) Appl. No.: 11/068,865

(22) Filed: Mar. 2, 2005

(65) Prior Publication Data

US 2006/0200438 A1    Sep. 7, 2006

(51) Int. Cl.
*G06F 7/00* (2006.01)

(52) U.S. Cl.
USPC .......................... 707/763; 707/809; 707/810

(58) Field of Classification Search
USPC .................. 707/756, 760, 763, 809, 810, 707/999.003–999.004, 999.101–999.106
See application file for complete search history.

(56) References Cited

U.S. PATENT DOCUMENTS

| | | | |
|---|---|---|---|
| 5,499,371 A | 3/1996 | Henninger et al. | |
| 5,765,159 A | 6/1998 | Srinivasan | |
| 5,819,255 A * | 10/1998 | Celis et al. | 707/2 |
| 5,829,006 A * | 10/1998 | Parvathaneny et al. | 707/101 |
| 6,226,637 B1 * | 5/2001 | Carey et al. | 707/4 |
| 6,385,603 B1 * | 5/2002 | Chen et al. | 707/3 |
| 6,470,354 B1 | 10/2002 | Aldridge et al. | |
| 6,662,188 B1 | 12/2003 | Rasmussen et al. | |
| 6,704,744 B1 | 3/2004 | Williamson et al. | |
| 6,711,582 B2 | 3/2004 | Aldridge et al. | |
| 6,748,374 B1 * | 6/2004 | Madan et al. | 707/3 |
| 7,499,936 B2 * | 3/2009 | Bettendorf | 1/1 |
| 2003/0033277 A1 * | 2/2003 | Bahulkar et al. | 707/1 |
| 2003/0217027 A1 * | 11/2003 | Farber et al. | 707/1 |
| 2003/0218639 A1 * | 11/2003 | Lee et al. | 345/853 |
| 2004/0054808 A1 * | 3/2004 | Ekberg | 709/245 |
| 2004/0123048 A1 * | 6/2004 | Mullins et al. | 711/141 |
| 2005/0015619 A1 * | 1/2005 | Lee | 713/201 |
| 2006/0064425 A1 * | 3/2006 | Kakivaya et al. | 707/100 |

OTHER PUBLICATIONS

Semantics and compatibility of Transact—SQL outer joins, G.N. Paulley Feb. 15, 2002, http://www.sybase.com/content/1017447/tsql.pdf.*

* cited by examiner

*Primary Examiner* — Robert Timblin
(74) *Attorney, Agent, or Firm* — Wilmer Cutler Pickering Hale and Dorr LLP

(57) ABSTRACT

As method is disclosed for retrieving data from a relational database management system (RDBMS). An object-oriented environment submits a query to an object relational layer to access data contained in the RDBMS. The object query can result in at least one logical object description that is defined using one or more predetermined expressions. The logical object descriptions are translated to corresponding relational descriptions, and a relational query is subsequently generated. The relational query is applied to the RDBMS in order to retrieve data satisfying the object query. Various error checks can be performed to detect correctness of the query. Additionally, the relational queries can be optimized to improve processing by the RDBMS.

25 Claims, 15 Drawing Sheets

SYSTEM AND METHOD FOR RETRIEVING DATA FROM A RELATIONAL DATABASE MANAGEMENT SYSTEM

BACKGROUND OF THE INVENTION

1. Technical Field

The present invention relates to relational database management systems and, more particularly, to object relational interfaces for retrieving data from relational database management systems.

2. Description of the Related Art

Relational database management systems (RDBMS) are known for utilizing relational techniques to store and retrieve data in relational databases. Typically, a relational database is an electronic system for storing information in the form of tables (or relations). Each column in a table represents a field, or subdivision, for storing a specific data type. A table also includes a set of rows (or records) spanning its columns. Furthermore, data stored in columns of one table can form the basis of relationships between other tables in the RDBMS that have related columns. Using such a relationship, for example, two tables can be joined to provide a single table containing rows from one table combined with related rows from another table. Various high level languages, such as the Structured Query Language (SQL), can be used to store, retrieve, and delete data from the RDBMS. The high level language is used to define a query denoting a set of commands for retrieving data stored in the database.

Object-oriented programming methodologies can also be used to perform operations on the database. In an object-oriented environment, objects encapsulate related data and procedures in order to hide such information from the remainder of the program, thereby allowing access to the data and procedures only through the object's interface. Thus, changes to the data or procedures of the object are relatively isolated from the remainder of the program.

Many applications are designed to operate in an object-oriented environment and interact with an RDBMS in order to store and retrieve data. In order to interact with the RDBMS, an Object-Relational (OR) layer is provided to translate the relation between objects in the object-oriented environment and tables in the RDBMS. This is done using a relational mapping schema (or mapping metadata) to encode three types of information.

FIG. 13 is a diagram illustrating some of the different types of information that can be included in the relational mapping schema (or mapping metadata) according to one conventional methodology. For example, a system having an RDBMS with two tables is designated using reference numeral 610. The first type of information encoded provides a description of the tables and columns. This may include, but is not limited to a description of the tables and columns that exist, any foreign key constraints, unique constraints, nullability constraints, and even domain specific check constraints.

FIG. 13 also illustrates an object model that describes the attributes of objects 612 that are mapped to the tables 610. The second type of information encoded relates to the object model. This kind of information can include, but is not limited to, a description of the object types, attributes, and associations that comprise the domain model, as well as any properties that participate in the logical identity of an object type. Finally, the relational mapping schema would include mapping metadata 614 which describes how the object model maps to the tables. The mapping metadata 614 can include, but is not limited to, a description of which columns are used to store properties of the object model, and what joins are required in order to fetch associations.

At least one challenge encountered when designing OR layers is the efficient use of the relational querying capabilities provided in a supplier's backend datastore. A technique frequently used to address this problem requires an application program interface (API) that sidesteps the abstraction provided by the OR layer. This allows the developer to specify arbitrary SQL queries against the relational schema. The OR layer can then either provide the developer direct access to the data from these queries, or use the queries to efficiently read in, and resurrect, object data. However, the developer must have a thorough understanding of the RDBMS in order to provide programming code and/or SQL queries specific to the application and the relationship to the RDBMS. This approach, however, tends to violate the abstraction provided by a good OR layer. There is also increased development overhead associated with making changes to the relational schema. Further, if a change is made to the RDBMS relational mapping schema, the developer must recode the programming code and SQL queries. This can limit the scalability of an application because large amounts of data must be read from the RDBMS and, depending on the system architecture, transferred over the network.

Another approach to designing OR layers is to provide an Object Query Language (OQL) that allows the developer to describe queries in terms of the object model instead of directly using the backend datastore's native querying capabilities. The OR layer can then translate these logical queries into native queries tailored to the particular relational schema that has been chosen for the given object model. At least one drawback of this technique is that queries used to perform the filtering on the RDBMS are not captured as part of the object model of the application, even though they may directly describe a commonly traversed association, e.g., an association between a folder and a subset of its children. Further, common patterns in queries will not be part of the object model, and cannot be captured as associations capable of being reused. Consequently, large sections of such queries must be duplicated in order to perform related queries.

SUMMARY OF THE INVENTION

The present invention allows for increased efficiency when retrieving data from an RDBMS using an object-oriented environment, by providing specified construction rules for defining object-to-object metadata. The predefined construction rules allow logical descriptions of objects that maintain abstractions in the object-oriented environment.

In accordance with one or more embodiments, a method is provided for retrieving data from a relational database management system (RDBMS). An object query is received from an object-oriented environment. Object descriptions are retrieved from a relational mapping schema. The object descriptions contain at least one logical object description that is defined using one or more predetermined constructs (e.g., expressions). Any logical object descriptions are translated to corresponding relational descriptions based on predetermined translation rules for the constructs. A relational query is subsequently generated to retrieve data from the relational database management system to satisfy the object query. According to such a method, greater abstraction of the object-oriented environment can be achieved. Further, specialized methods/routines are not necessary to map objects to the relational database management system.

According to one or more specific aspects of the present invention, error detection routines can be applied to reduce the possibility of failures resulting from, for example, nested logical object descriptions. At least one error detection routine creates a stack for storing logically derived associations. Upon encountering a logically derived association in the metadata file, the stack is searched for any occurrences thereof. If the logically derived association is not found, then it is pushed onto the stack. However, if it is found, then an error can be generated. For example, the presence of logically derived associations identifies recursions that can prevent evaluation of the expression. Accordingly, rather than risking a failure which can possibly require time to repair, a new (or refined) object query can be applied to the relational database management system.

According to one or more additional embodiments of the present invention, the relational queries can be optimized in various ways to improve processing by the relational database management system. Furthermore, certain optimized relational queries can be cached so that a new optimization will not be necessary if the same, or similar, object query is received. The optimized queries are cached such that they can be applied to object queries that result in semantically identical relational queries. For example, a semantically identical relational query may have different names for the variables, but optimization would result in the identical expressions.

These, and various features of novelty which characterize the invention, are pointed out with particularity in the appended claims forming a part of this disclosure. For a better understanding of the invention, its operating advantages, and the specific benefits attained by its uses, reference should be had to the accompanying drawings and embodiments of the invention.

DETAILED DESCRIPTION OF THE INVENTION

Figure 1:
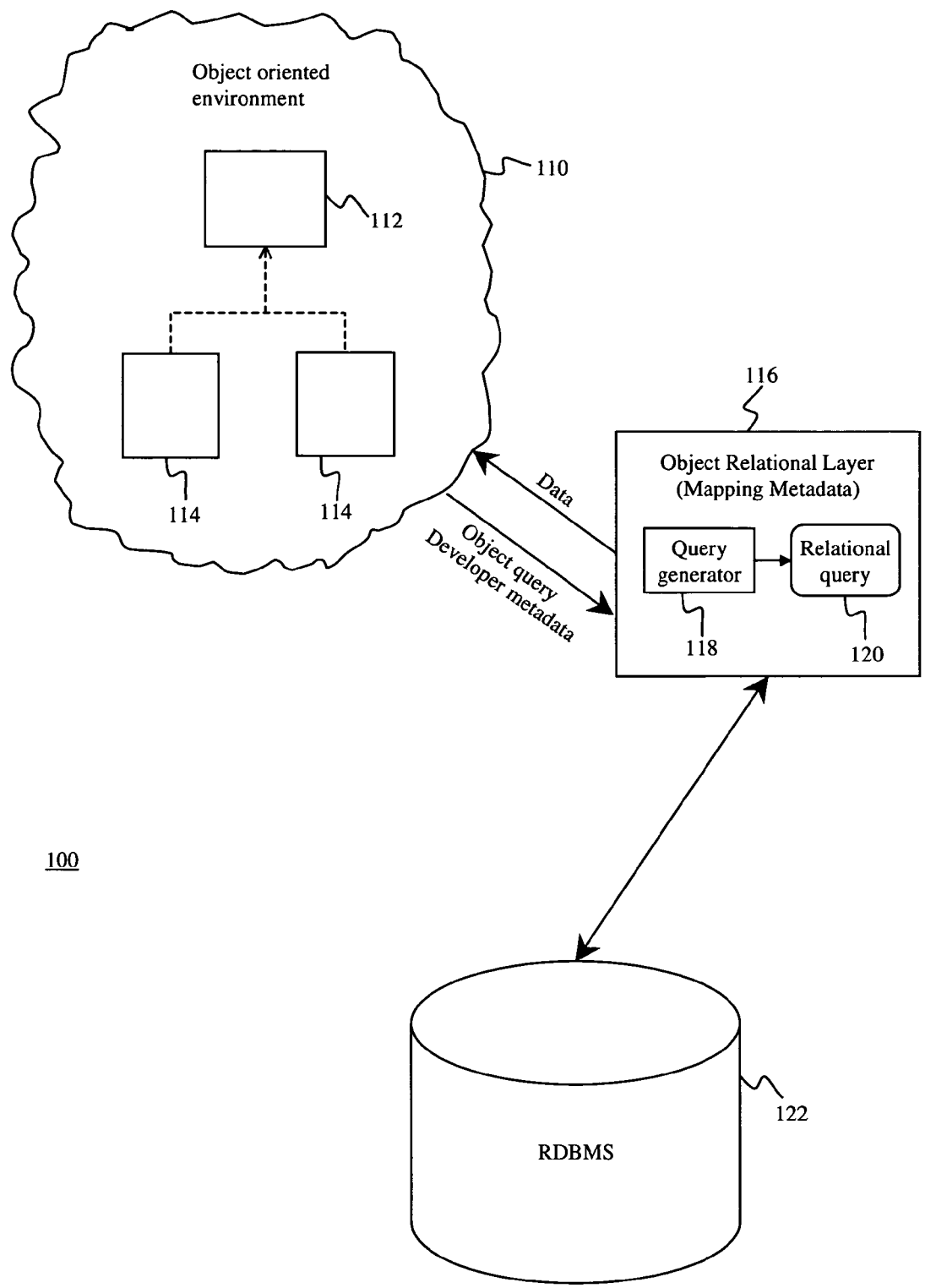
FIG. 1 is block diagram conceptually illustrating a system for generating queries in accordance with at least one embodiment of the present invention.

FIG. 1 illustrates a query generating system 100 in accordance with one or more embodiments of the present invention. The query generating system 100 includes an object-oriented environment 110, an object relational layer 116, and a relational database management system (RDBMS) 122. The object-oriented environment 110 can include, for example, one or more objects 112 (only one shown) as well as a plurality of additional objects 114 that extend the properties of the first object 112. The object-oriented environment 110 can be in the form of a number of programming environments and/or applications that require access to data contained in the RDBMS 122. Further, the object-oriented environment 110 can function as, for example, an abstraction layer for environments such as a client server environment.

In order to retrieve data from the RDBMS 122, the object relational layer 116 produces a query that can be submitted to the RDBMS 122. The object-oriented environment 110 can interact with the object relational layer 116 in a number of ways, depending on the specific configuration of the query generating system 100. For example, communication can take place across one or more networks such as a local area network, a wide area network, the Internet, etc. The object-oriented environment 110 can also exist on the same physical system as the object relational layer 116. Further, the object relational layer 116 can interact with the RDBMS using similar communication techniques. The object relational layer 116 includes mapping metadata that describes the relationship between the objects 112, 114 of the object-oriented environment 110 and tables contained in the RDBMS 122. The mapping metadata can include, for example, information describing the relationship between the attributes and methods in the objects 112, 114 relative to columns of the RDBMS 122.

According to one or more embodiments of the present invention, the object-oriented environment further includes developer metadata which contains logical object descriptions and the appropriate relational definitions for applying object queries to the RDBMS 122. The developer metadata specifies the logical object descriptions in terms of an expression language having predetermined constructs, discussed in greater details below. For example, developer metadata can be used to define an employee object as follows:

```
object type Employee {
    BigInteger id = employee_id;
    BigInteger supervisor = supervisor_id;
    Integer salary = salary;
    BigInteger division = division_id;
    object key(id);
}
```

The constructs of the present invention allow object queries to be defined against objects in the object-oriented environment 110 without affecting the mapping metadata contained in the object relational layer 116. Thus, if changes are made to one or more objects in the object-oriented environment 110, there is no need to provide special program code, or to reprogram relationships, contained in the object relational layer 116. The same developer metadata and mapping metadata can be used by the object relational layer 116 to generate and apply queries against the RDBMS 122.

Upon receiving an object query and the developer metadata from the object-oriented environment 110, the object relational layer 116 supplies this information to a query generator 118. The query generator converts the object query based, at least in part, on the developer metadata and the mapping metadata. The query generator produces a relational query 120 that is consistent with the object query, and submits the relational query 120 to (i.e., applies it against) the RDBMS 122. The RDBMS 122 then produces data in the form of, for example, a table containing one or more rows that satisfy the object query. The data is then returned to the object relational layer 116. The object relational layer 116 subsequently transmits the data back to the object-oriented environment 110. The described embodiments for generating a relational query for interfacing an object-oriented environment to a relational database management system may be implemented by a computer program product, residing on a computer-readable medium. The computer program product includes instructions that when executed by a computer system, carries out the functionality and produces results associated with the embodiments described herein. The computer-readable medium includes media and devices known in the art that can store instructions for execution by a computer system, and so does not include transient media such as signals or carrier waves.

Figure 2:
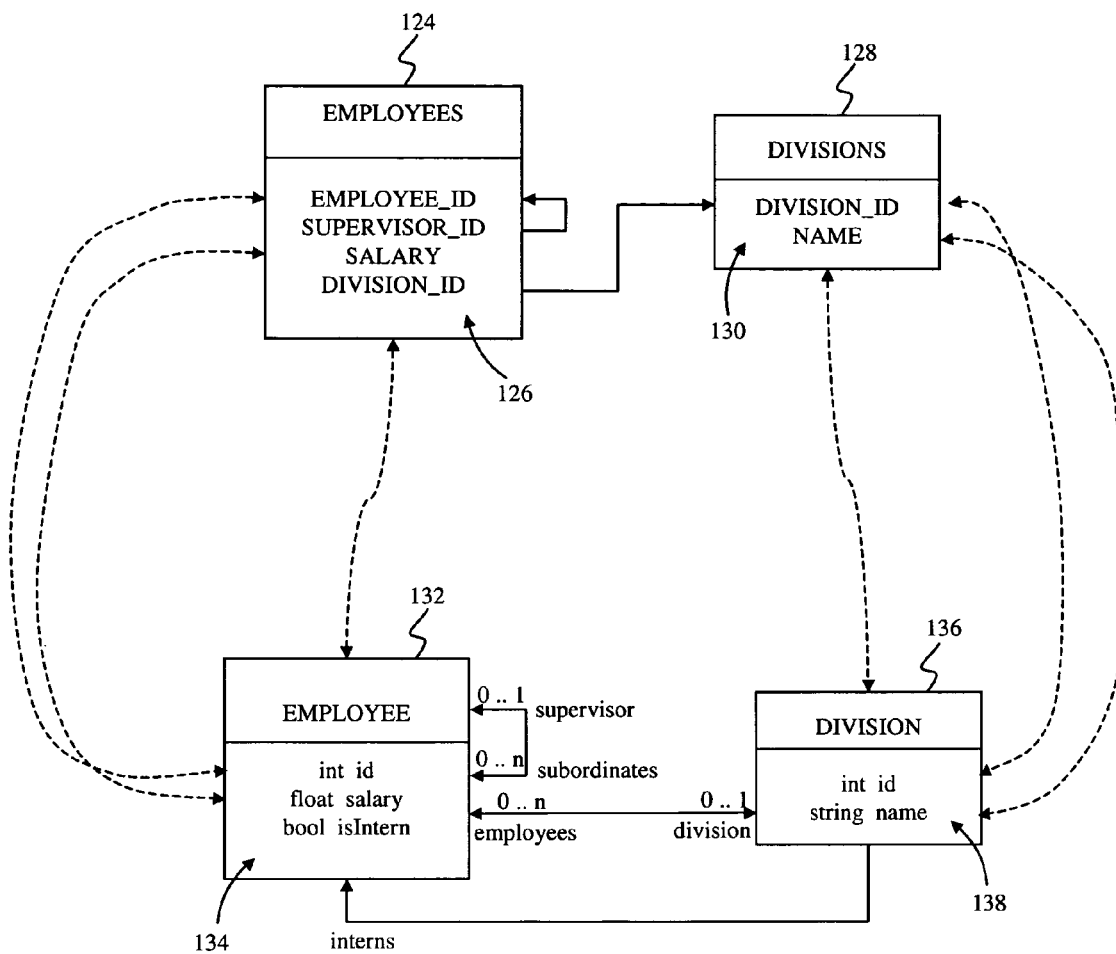
FIG. 2 is a diagram illustrating exemplary tables and corresponding object models that can be used with at least one embodiment of the present invention.

FIG. 2 illustrates the relationship between exemplary tables and object models that can be used with one or more embodiments of the present invention. As shown in FIG. 2, there are two tables represented using entity relation diagrams 124, 128. The EMPLOYEES table 124 contains a number of columns 126, namely EMPLOYEE_ID, SUPERVISOR_ID, SALARY, and DIVISION_ID. The DIVISIONS table 128 contains two columns 130, namely DIVISION_ID and NAME. The entity relation diagram also illustrates the relationship between the EMPLOYEES table 124 and the DIVISIONS table 128. For example, the EMPLOYEES table 124 includes a foreign key constraint from the DIVISION_ID column to the DIVISION_ID column of the DIVISIONS table 128. Accordingly, the value in the EMPLOYEES table 124 is dependent on the DIVISION_ID column of the DIVISIONS table 128. There is also a foreign key constraint from the SUPERVISOR_ID column to the EMPLOYEE_ID column. Furthermore, it should be understood that the EMPLOYEE_ID column and the DIVISION_ID column represent primary key constraints for each of the tables 124, 128, i.e., the column used to uniquely identify each row in the table.

FIG. 2 also illustrates the object models corresponding to the EMPLOYEES table 124 and the DIVISIONS table 124. The EMPLOYEE object model 132 includes three attributes 134: id, salary, and isIntern. The id attribute corresponds to the EMPLOYEE_ID column of the EMPLOYEES table 124. The salary attribute corresponds to the SALARY column of the EMPLOYEES table 124. In the DIVISION object model 136, there are two attributes, the id and the name of the division. The id corresponds to the DIVISION_ID column of the DIVISIONS table 128 and the name corresponds to the NAME column of the DIVISIONS table 128.

As shown in FIG. 2, the object models 132, 136 further provide information that describes navigation between various instances of the EMPLOYEE and DIVISION classes 132, 136, as well as the possible multiplicities that can occur. For example, there is at most one division 136 for each EMPLOYEE 132. In contrast, however, there can be multiple instances (0 . . . n) of EMPLOYEES 132 within a given DIVISION 136. The object models 132, 136 also indicate that the number of EMPLOYEES 132, within a DIVISION, who are interns can be determined using an appropriate filter on the isIntern attribute.

Figure 3:
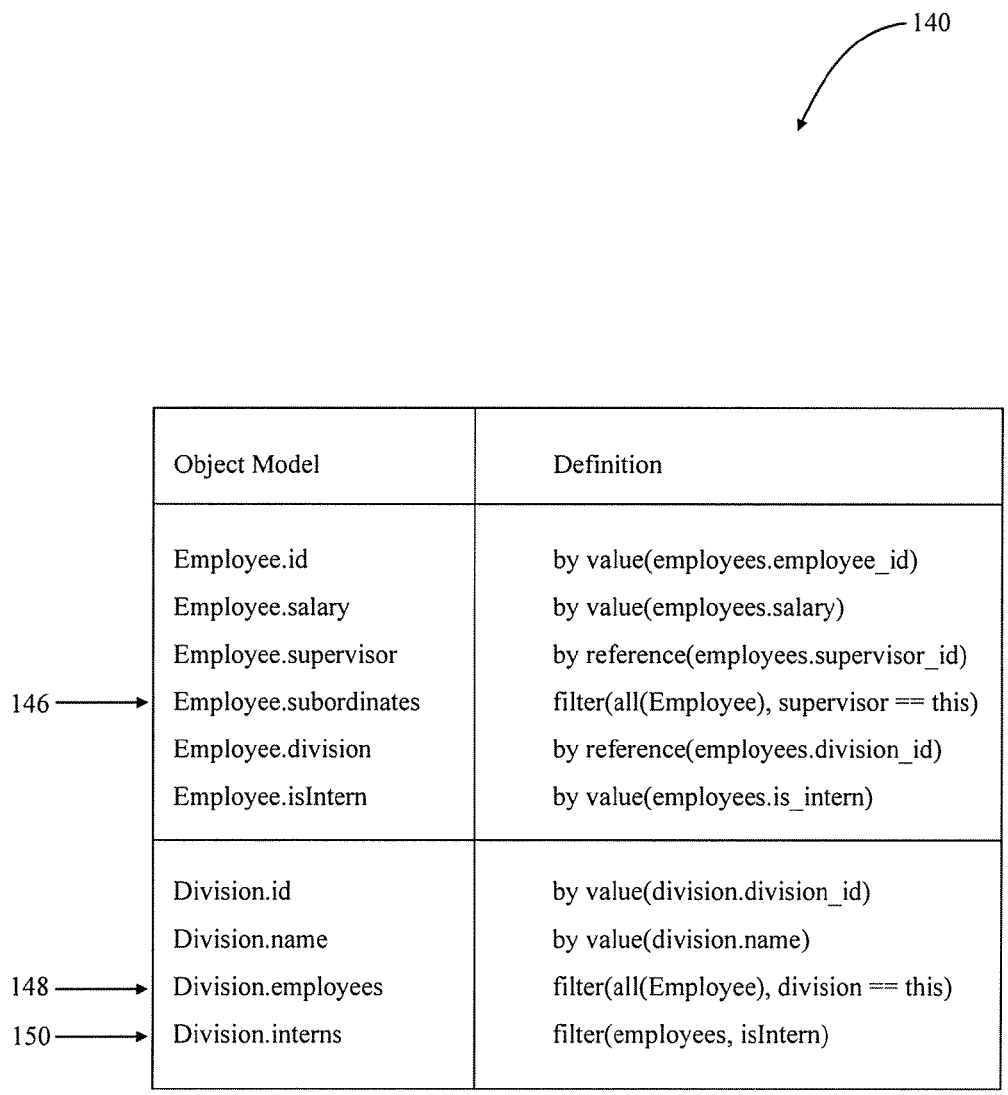
FIG. 3 is a mapping table illustrating translation rules between the objects and tables of FIG. 2 according to one or more embodiments of the present invention.

FIG. 3 illustrates a mapping table 140 for defining the relationships between the object models of FIG. 2 in the corresponding tables. For example, the Employee.id attribute of the EMPLOYEE object 132 is defined by value to the EMPLOYEE_ID column of the EMPLOYEES table 124. Similarly, various other attributes such as salary, Division.id, etc. are defined in the mapping table 140. According to one or more embodiments of the present invention, the mapping table 140 can further include logical object descriptions as query definitions to be applied against the RDBMS 122. As used herein, logical object descriptions are mapping definitions for an object model which do not map directly to a column in tables of the RDBMS 122. For example, the definition for the Employee.subordinates attribute 146 is provided purely logically by filtering all employees on the current supervisor. The Division.employees attribute 148 and the Division.interns attribute 150 are also defined logically. As can be seen from the mapping table 140, these logical object descriptions do not provide a specific reference to any columns of the tables contained in the corresponding tables 124, 128.

According to one or more embodiments of the present invention, the query generator 118 converts these logical definitions into relational queries based, at least in part, on specific translation rules provided by an expression language. The expression language allows developers to fully represent the object model by defining developer metadata which can be provided to the object relational layer. Therefore, the need to provide specific translations, in the form of program code, to convert these logical definitions can be eliminated. Further, greater abstraction can be maintained between the object-oriented environment 110 and the RDBMS 122. The following is a description of the constructs used in an exemplary expression language, together with various examples.

<LITERAL>: A literal expression evaluates to a constant value. The value and type of this expression do not change with context. Valid Examples:

3
3.14
"Three"
null all (<QUALIFIED_NAME>): An all expression evaluates to the set of all instances of the given qualified name. A qualified name must refer to an existing object type in the given object model. Valid Examples:

com.example.Employee

<IDENTIFIER>: An identifier is a name whose value is found in the current environment. The type and multiplicity of this expression is looked up directly in the environment by traversing the nested scopes in order from the innermost to the outermost and stopping when the first mapping entry keyed by the name of the identifier is encountered. The type and multiplicity of this mapping entry then become the type and multiplicity of the identifier expression in the given environment. Valid Examples:

id
employee
employeeID

Integer
street
street1
Invalid Examples:
employee ID (contains a space)
1street (starts with a number)

<expression>.<IDENTIFIER>: The get operator performs navigation of the object graph. For example, referring to FIG. 3, consider an object such as "d.interns.salary". If "d" is a division, then the expression refers to the collection of salaries of the interns in the division "d". The get operator can be used on any expression/identifier pair so long as the type of the expression contains a property with the same name as the identifier. The resulting type of the expression is the type of the property selected by the identifier. Every object has a type. The type defines various properties for each object of that type. Each property has a name, a type, and a multiplicity. The type of the property constrains the values of the property to be of the property's type. For example, referring to FIG. 3, the supervisor property of an employee would be of type Employee. Thus, an employee can be a supervisor of another employee. However, a division cannot be a supervisor of an employee. The multiplicity of a property indicates how many values the property can have. The multiplicity can be referred to as reference (at most 1) or collection (any number). For example, an employee can have only 1 salary, but many subordinates if that employee is a supervisor. There are also simple (or primitive) types such as integers or strings. Objects of these types do not have properties, but just have a value. Further, certain types can be declared as inheriting from a parent type. This simply means that they automatically have the properties of the parent type, but can also have additional properties.

The result of a get has the multiplicity of a reference only if the expression and property have the multiplicity of a reference. The expression's multiplicity can be defined in the environment of the get expression. Thus in an environment in which "employee" is a reference, "employee.supervisor" and "employee.supervisor.supervisor" are references (meaning they can have at most one value). However, the multiplicity of an expression such as "all(com.example.Employee).supervisor" would be a collection. Such an expression refers to the collection that is taken by listing the supervisor of the employee for every employee. The expression is not a reference, even though the supervisor property is a reference because the all expression is a collection. The multiplicity of the resulting expression can be determined using the following table:

| <expression> | property | result |
| --- | --- | --- |
| reference | reference | reference |
| reference | collection | collection |
| collection | reference | collection |
| collection | collection | collection |

Valid Examples:
employee.supervisor
employee.supervisor.supervisor
all(com.example.Employee).supervisor
all(com.example.Employee).supervisor.supervisor filter (<expression>, <expression>): The filter expression operates on a set of objects and a condition. It evaluates to only those instances of the first expression for which the second expression evaluates to true. The filter expression introduces a new scope to the environment of the second expression. That scope is based on the type of the first expression. The type of this expression is the type of its first argument. The multiplicity of this expression is bounded above by its first argument and below by zero. Valid Examples:
filter(all(com.example.Employee), is Retired)

<expression>==<expression>: The equals operator is a simple Boolean expression that serves as a building block for larger conditions. Valid Examples:
id==zip
name=="Bob"
supervisor.id==id
filter(all(com.example.Employee), id==3)=="Bob"

<expression> and <expression>: The and expression is used to build up compound Boolean expressions from simpler ones. This has the semantics of logical and. Valid Examples:
name=="Bob" and supervisor.id==3

<expression> or <expression>: The or expression is used to build up compound Boolean expressions from simpler ones. This has the semantics of logical or. Valid Examples:
name=="Bob" or id==3 not (<expression>): The not expression is used to logically negate any Boolean expression. Valid Examples:
not (id==3)

exists (<expression>): The exists expression is a primitive Boolean operation used to test the existence of a reference, set, or subquery that identifies a set of instances. Valid Examples:
exists(supervisor)
exists (employees)
exists(filter(employees, id==3))

<IDENTIFIER>=<expression>: The define expression is used to create a temporary name for an expression. This is most often used to avoid name collision between nested scopes. The type of this expression is a derived type that has a single property with the same type as the given expression and named by the given identifier. Valid Examples:
emp=all(com.example.Employee)

join (<expression>, <expression>, <expression>): The join expression is used to select from among the Cartesian product of all instances in the first two expressions. The third expression is evaluated in an environment extended by the type of both the first and second expression. The type of this expression is a derived type that contains all the properties of the types of the first and second arguments. This type is keyed by the keys of the types of the first and second argument. It is an error if the first and second arguments have properties with the same name, therefore join expressions may be used on define expressions in order to avoid name collision. Valid Examples:
join(emp=all(com.example.Employee),
group=all(com.example.Group),
exists(filter(m=group.members, emp=m)))

cross (<expression>, <expression>): The cross expression is identical to the join expression with true as its third argument. The cross expression represents the Cartesian product of the two expressions specified as arguments. It pairs each element of one set with every element of a second set. For example, the Cartesian product (or crossing) of {a, b, c} and {d, e} is {(a, d), (a, e), (b, d), (b, e), (c, d), (c, e)}. Valid Examples:
cross(emp=all(com.example.Employee),
group=all(com.example.Group))

left (<expression>, <expression>, <expression>): This is identical to the join expression except in the case that the third expression would cause an instance in the first expression to be eliminated entirely, in which case that instance is retained with a null value in the properties of the second type. The value of a left expression is composed two parts. The first part is equivalent to a join expression with the same 3 arguments. To this result is added any instance of the first expression that is not already part of the result. When these values are added to the result, they are paired (as required in a Cartesian product) with null values for the properties of the type of the $2^{nd}$ argument. Valid Examples:

left(emp=all(com.example.Employee),
group=all(com.example.Group),
exists(filter(m=group.members, emp=m)))

right (<expression>, <expression>, <expression>): This is identical to the left expression with the first two arguments swapped. The value of a right expression is also composed of two parts. The first part is equivalent to a join expression with the same 3 arguments. To this result is added any instance of the second expression that is not already part of the result. When these values are added to the result, they are paired (as required in a Cartesian product) with null values for the properties of the type of the first argument. Valid Examples:

right(emp=all(com.example.Employee),
group=all(com.example.Group),
exists(filter(m=group.members, emp=m)))

if (<expression>, <expression>, <expression>): The if expression is a functional if statement. The resulting value is either its second or third argument depending on the value of the first. The types of the second and third argument must either be coercible into the same type or must both inherit from the same type. The type of the "if" statement is determined to be either the most specific type from which the types of the second and third arguments both inherit or the most specific type into which the types of the second and third arguments can be coerced. Coercion refers to the conversion of a value of one type into a value of another type, usually without the loss of precision. For example, the integer 1 could be converted into the floating point number 1.0. Usage of the terms "coerce", "inherit", and "specific" is consistent with their definitions in object-oriented type theory. Valid Examples:

if(id==zip, 'Identified by Zip Code', 'N/A')

sort (<expression>, <expression>): The sort expression reorders the instances in the first expression based on the value of the second expression. The environment is extended using the type of the first expression, and the second expression is evaluated once for each instance in the first expression. The resulting values form the sort keys for the final ordering. The type of this expression is the type of its first argument. Valid Examples:

sort(all(com.examples.Employee), salary)

limit (<expression>, <expression>): Returns the first n instances of the first expression where n is the result of evaluating the second expression. The type of this expression is its first argument. Valid Examples:

limit(sort(all(com.examples.Employee), salary), 10)

offset (<expression>, <expression>): Returns all but the first n instances of the first expression where n is the result of evaluating the second expression. The type of this expression is its first argument. Valid Examples:

offset(sort(all(com.examples.Employee), salary), 10)

size (<expression>): Returns the number of instances in the given expression. Valid Examples:

size(filter(all(com.examples.Employee), salary>250000))

Figure 4:
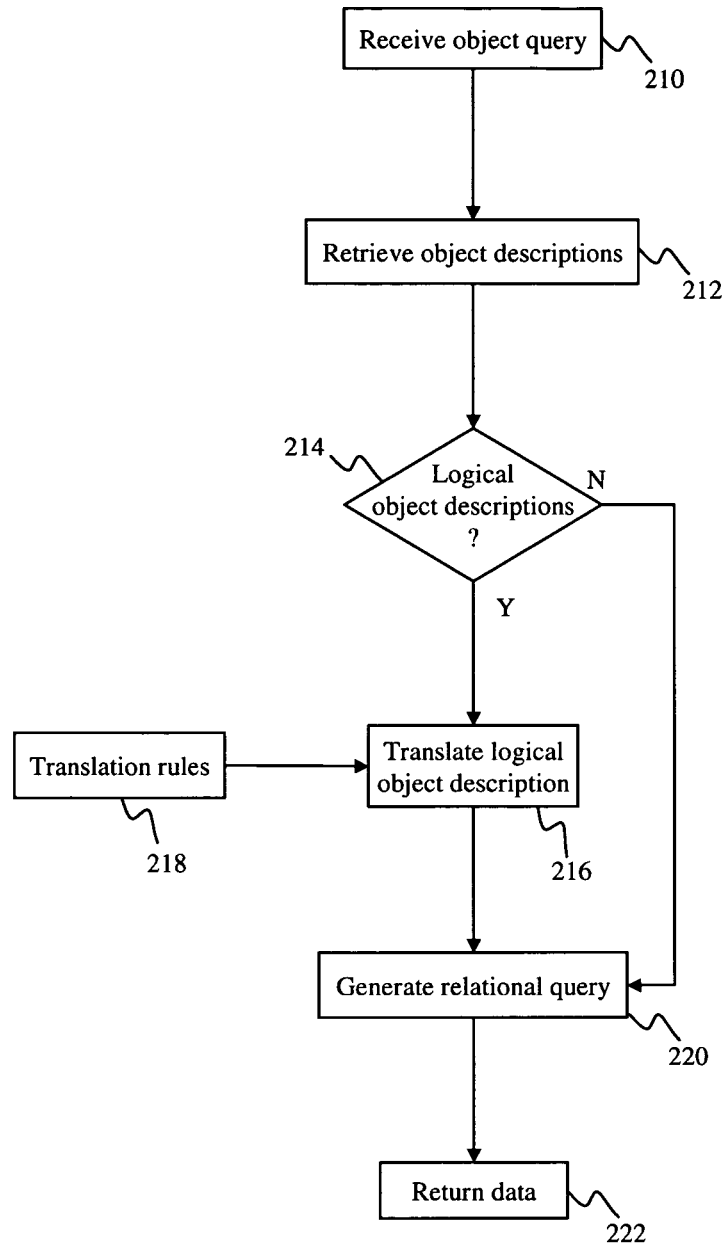
FIG. 4 is a flowchart illustrating steps performed to retrieve data from the RDBMS in accordance with one or more embodiments of the present invention.

FIG. 4 is a flowchart illustrating the steps performed to retrieve data from the RDBMS by the object-oriented environment according to one or more embodiments of the present invention. At step 210, the object relational layer receives an object query from the object-oriented environment. This can correspond, for example, to an application request to retrieve information from the RDBMS. At step 212, the description of objects contained in the object query is retrieved. According to at least one embodiment of the present invention, the description can be in the form of object models, as previously described. Such descriptions can also correspond to information regarding how the objects within the object-oriented environment should be mapped to the tables contained in the RDBMS. Typically, such information is contained in the mapping metadata stored in the object relational layer.

At step 214, it is determined whether the object descriptions contain logical object descriptions. For example, the object descriptions may not include logically derived associations, and thus can be easily mapped to tables of the RDBMS using SQL statements. Referring again to FIG. 3, the Employee.id attribute has a relationship to the EMPLOYEE_ID column of the EMPLOYEE table 132. Thus, such an attribute is not described by a logical relationship. However, attributes such as Employee.subordinates 146, Division.employees 148, and Division.interns 150 are defined by purely logical relationships. As previously discussed, the object query can further be accompanied by developer metadata. The developer metadata would include various logical descriptions of object attributes from the object-oriented environment. Thus, if logical object descriptions are included in the object query, then the object query would be accompanied by developer metadata. Alternatively, the developer metadata can be included as part of the mapping metadata, as will be discussed in greater detail below.

If the query includes any logical object descriptions then at step 216, the query generator translates the logical object descriptions into relationships that can be submitted to the RDBMS. During the translation process, the query generator retrieves translation rules, as indicated by step 218, that define the particular relationship between the logical object description and columns of the tables in the RDBMS. More particularly, the query generator examines the definitions specified by the expression language in order to determine how the logical object descriptions should be defined in terms of logical relations in the RDBMS. At step 220, a relational query such as, for example, a SQL query that can be submitted to the RDBMS is generated. If the object query did not include any logical object descriptions at step 214, then control would pass to step 220 where the relational query would also be generated. Such a relational query would be generated based on, for example, conventional metadata definitions contained in the object relational layer. At step 222, the object relational layer returns data satisfying the object query. The data is received from the RDBMS based on the relational query.

Figure 5:
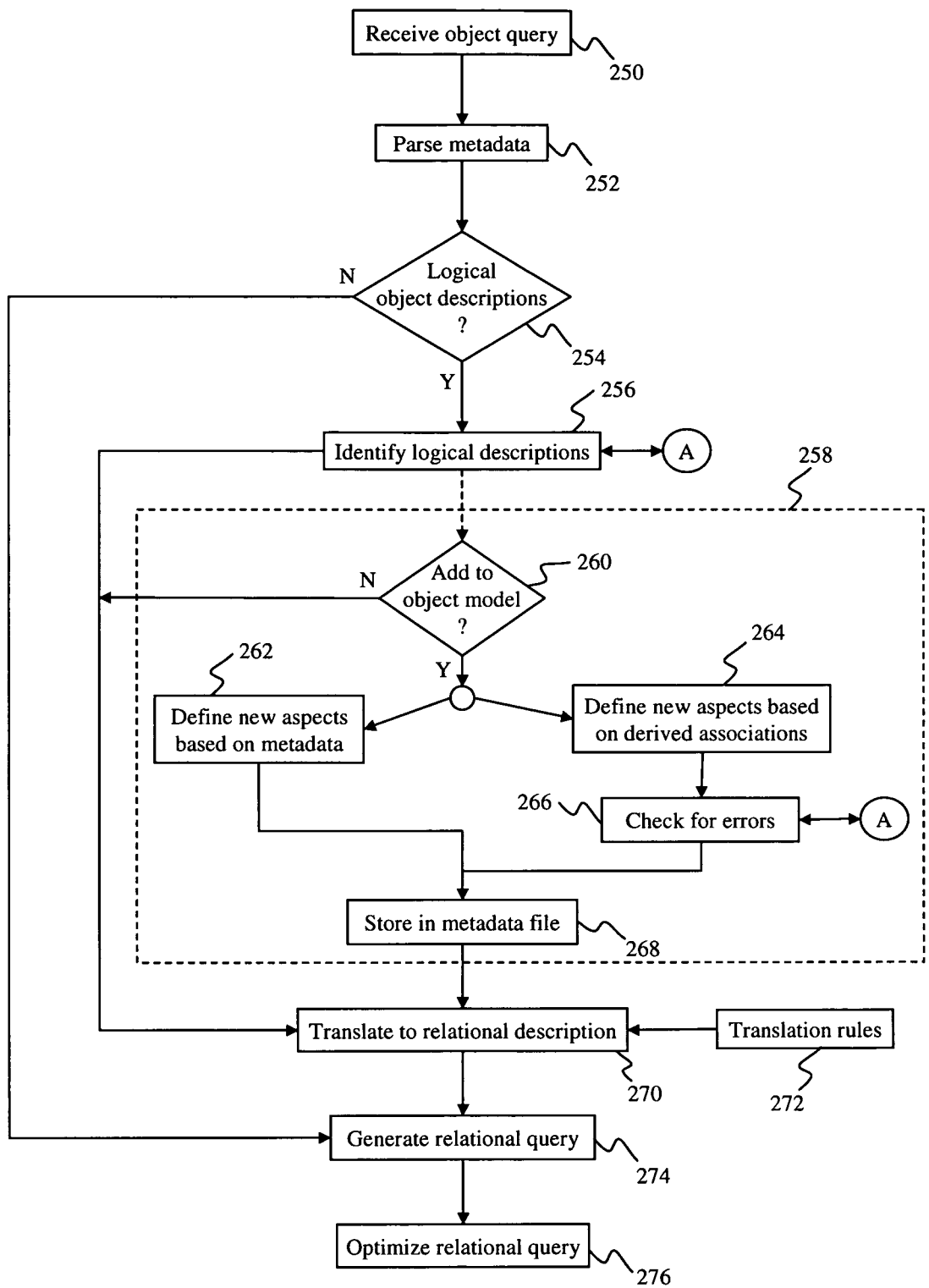
FIG. 5 is a flowchart illustrating steps performed to generate a relational query according to one or more embodiments of the present invention.

FIG. 5 is a flowchart illustrating the steps performed to generate a relational query according to one or more embodiments of the present invention. At step 250, the object query is received from the object-oriented environment. The object relational layer submits this object query to the query generator where the metadata describing the definition of the object model relative to the RDBMS is parsed. This is illustrated at step 252. According to at least one embodiment of the invention, the query generator parses the object query by converting a string representation of the object query into an expression tree. At step 254, the query generator determines whether any logical object descriptions exist in the parsed metadata. As previously discussed, if there are any logical object descriptions, the object query could optionally include developer metadata. Accordingly, the developer metadata can also be parsed, under such circumstances, at step 252. If there are no logical object descriptions, then control passes to step 274, where the relational query is generated. If there are any logical object descriptions, however, then they are identified at step 256. According to at least one embodiment of the present invention, the logical object descriptions can be submitted for one or more error checks by passing control to block A. As will be discussed in greater detail below, the error checks are performed on the logical object descriptions and the result of the error checks are returned to control block 256.

According to one or more embodiments of the present invention, the query generator can be configured to produce new developer metadata corresponding to certain object descriptions. For example, if certain logical object descriptions are submitted constantly over a period of time, then the query generator can automatically produce new logical object descriptions that are stored in the mapping metadata so that developer metadata does not have to be submitted with the object query. This is illustrated in the steps identified by reference numeral 258. In order to produce the new logical object descriptions, the query generator determines if new logical object descriptions should be added to the mapping metadata at step 260. For example, new logical object descriptions could be added if the developer indicates that some (or all) new logical object descriptions should be added. Further, the system can automatically add new logical object descriptions based on a predetermined threshold frequency, for example, if the description is received more than a certain number of times within a one-hour interval. If no new logical object descriptions need to be added, then control passes to step 270. However, if new logical object descriptions should be added, this can be done in a variety of ways.

According to at least one embodiment of the invention, at step 262 the new logical object descriptions are defined based on metadata that currently exists within the object relational layer (i.e., the existing mapping metadata). Once the logical object descriptions are defined, control passes to step 268. According to other embodiments of the present invention, the query generator can produce the new logical object descriptions based on existing logical object descriptions. These particular descriptions would be in the form of derived associations as in step 264. Such existing object descriptions can be obtained from, for example, the developer metadata and/or using newly defined logical relations that have been previously stored in the mapping metadata. At step 266, error checks are performed on the logical object descriptions. Thus, control passes to block A, and the results of the error detection process are returned.

At step 268, the newly defined logical relationships are stored in the metadata file. At step 270, the logical object descriptions are translated to relational descriptions. This is done, as previously discussed, based on predetermined translation rules 270 that specify how the logical object descriptions should be translated in order to maintain abstraction and the necessary relationships defined by the attributes of the object. Referring additionally to FIG. 3, for example, the Division.interns field 150 of the object model would be translated to the statement filter (employees.isIntern). At step 274, the query generator produces a relational query that satisfies the object query received from the object-oriented environment. According to one or more embodiments of the invention, such as the embodiment illustrated in FIG. 5, the relational query can be optimized in order to improve execution. For example, if SQL queries are being produced as the relational query, then step 276 will produce commands and operations that query the database and return data at an optimal pace. Optimization of the relational query will be discussed in greater detail with reference to FIG. 7.

Figure 6:
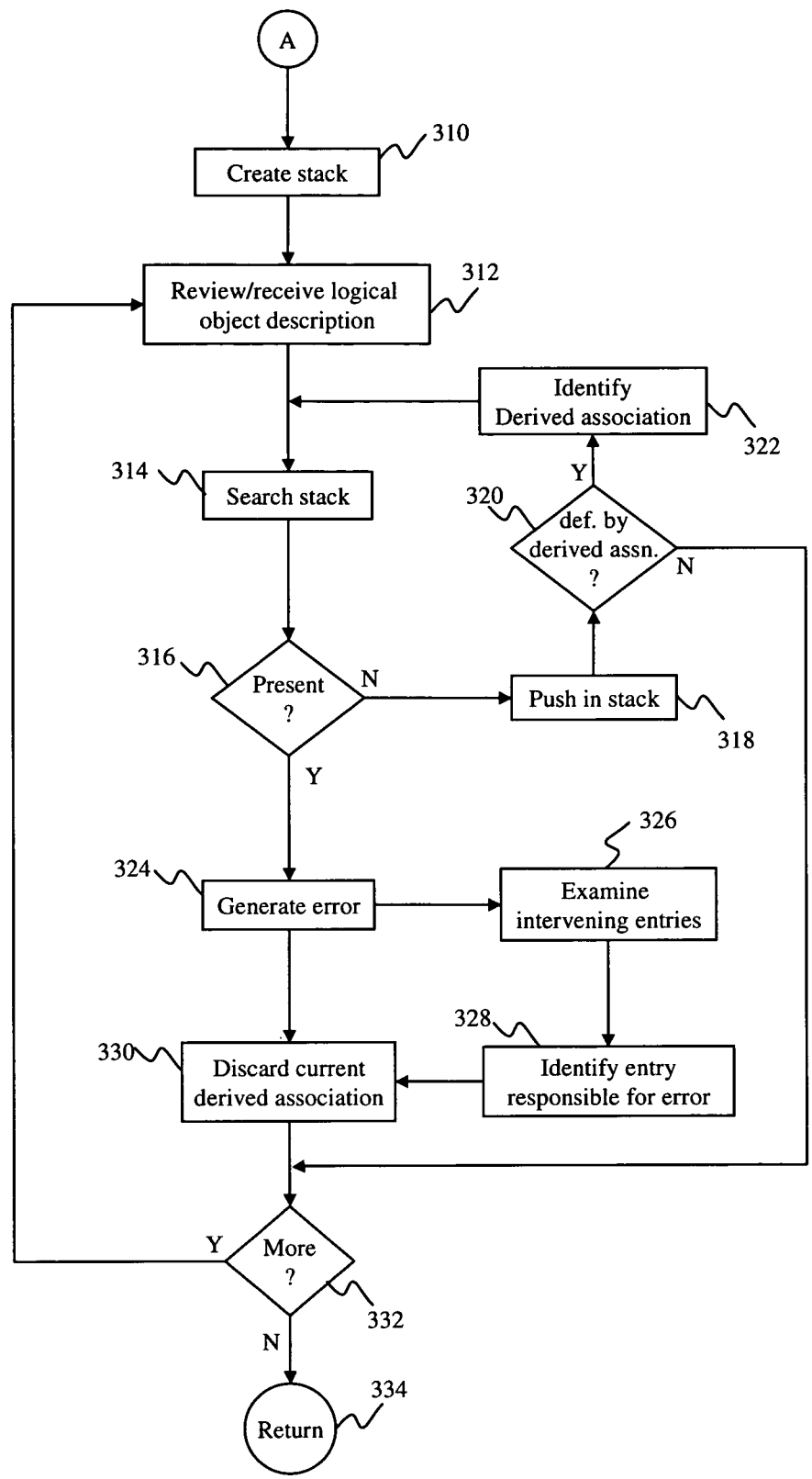
FIG. 6 is a flowchart illustrating steps performed to detect errors in logical object descriptions according to one or more embodiments of the present invention.

FIG. 6 is flowchart illustrating the steps performed to detect errors in the logical object descriptions according to one or more embodiments of the present invention. At step 310, a stack is created for the current object query. The stack can be used, for example, to detect and identify certain classes of errors in the definitions of derived associations. Each entry in the stack corresponds to a single derived association. The derived associations correspond to logical object descriptions that are defined in terms of other logical object descriptions (e.g., where the logical object description contains another logical object description). At step 312, logical object descriptions are received and/or reviewed in order to determine if they contain any derived associations. At step 314, the stack is searched in order to determine its content (i.e., the derived associations stored in the stack). At step 316, it is determined whether the derived association is present in the stack. According to one or more embodiments of the invention, steps 314 and 316 can also be combined into a single step.

If the derived association is not present (or the stack is empty), then it is pushed into the stack at step 318. At step 320, it is determined whether the derived association is itself defined by a logically derived association. If so, then the logically derived association used in the definition is identified at step 322. Control then returns to step 314 where the stack is searched for the logically derived association that is identified at step 322. Otherwise, if the definition does not include any logically derived associations, then control passes to step 332. If at step 316 the logically derived logical association is present in the stack, then an error is generated at step 324. As previously indicated, the presence of a logically derived association indicates a recursive condition that can prevent evaluation of the statement and/or query.

According to one or more embodiments of the present invention, attempts can be made to identify the source of the error. For example, some of the sources of error can include, without limitation, absence of certain variables, self-dependency, etc. The intervening entries in the stack between the location where the derived association is found and the top of the stack are examined at step 326. During this examination, the entries are reviewed in order to identify which entry may be responsible for the error. For example, the error can be a result of a logically derived association that ultimately depends upon itself, and therefore will never be resolved. Furthermore, an error can occur if one or more variables existing in the logically derived association do not exist in the tables of the RDBMS.

Once the entries are identified, the current derived association is discarded at step 330. In addition, if no steps are performed to identify the source of the error, then the logically derived association is automatically discarded once the error is generated. At step 332, it is determined whether any additional entries (i.e., logically derived associations) exist in the object query. If there are additional entries, then control returns to step 312 where the process is repeated for that particular entry. If there are no additional logically derived associations in the object query, then at step 334 control is returned to the location where the procedure was called. For example, referring back to FIG. 5, if an error check was requested at either step 256 or step 266, then control would return to these steps.

Figure 7A:
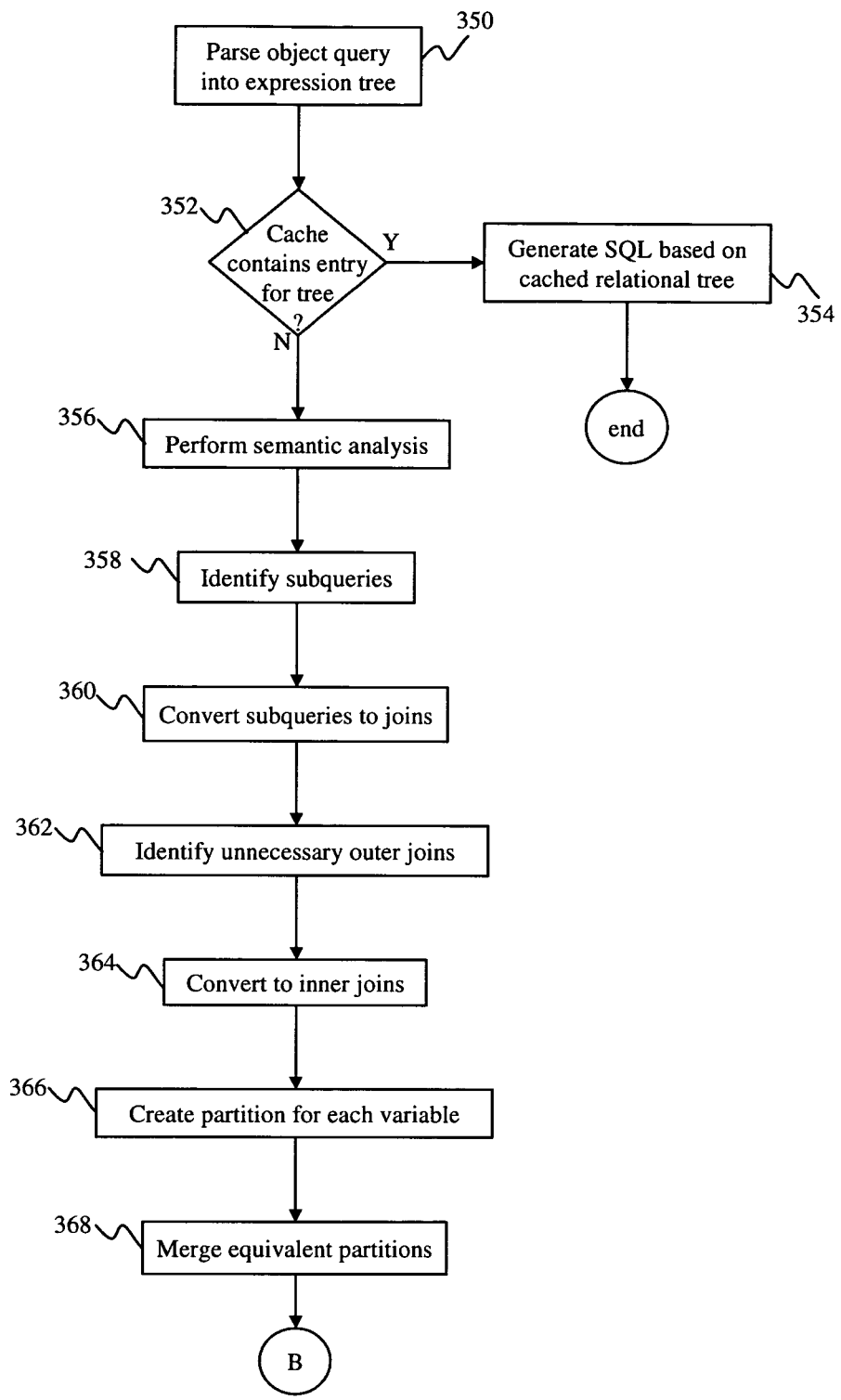
FIGS. 7A and 7B are a flowchart illustrating steps performed to optimize relational queries according to one or more embodiments of the present invention.

FIG. 7A is a flowchart illustrating optimization of a relational query according to one or more embodiments of the present invention. At step 350, the object query is parsed into an expression tree. At step 352, it is determined whether a cached expression tree corresponding to the current expression tree exists. The expression tree can be stored, for example, in memory, on a local storage device, a remote storage device, etc. If a cached expression tree exists, then a relational query is generated based on the cached expression tree at step 354. The process would then end. However, if there is no cached expression tree that corresponds to the current expression tree, then control passes to step 356 where a semantic analysis, or traversal, is performed on the expression tree. Traversal of the expression tree results in the creation of scopes and derived types as well as a determination of the scope within which each variable's value is defined.

Figure 8:
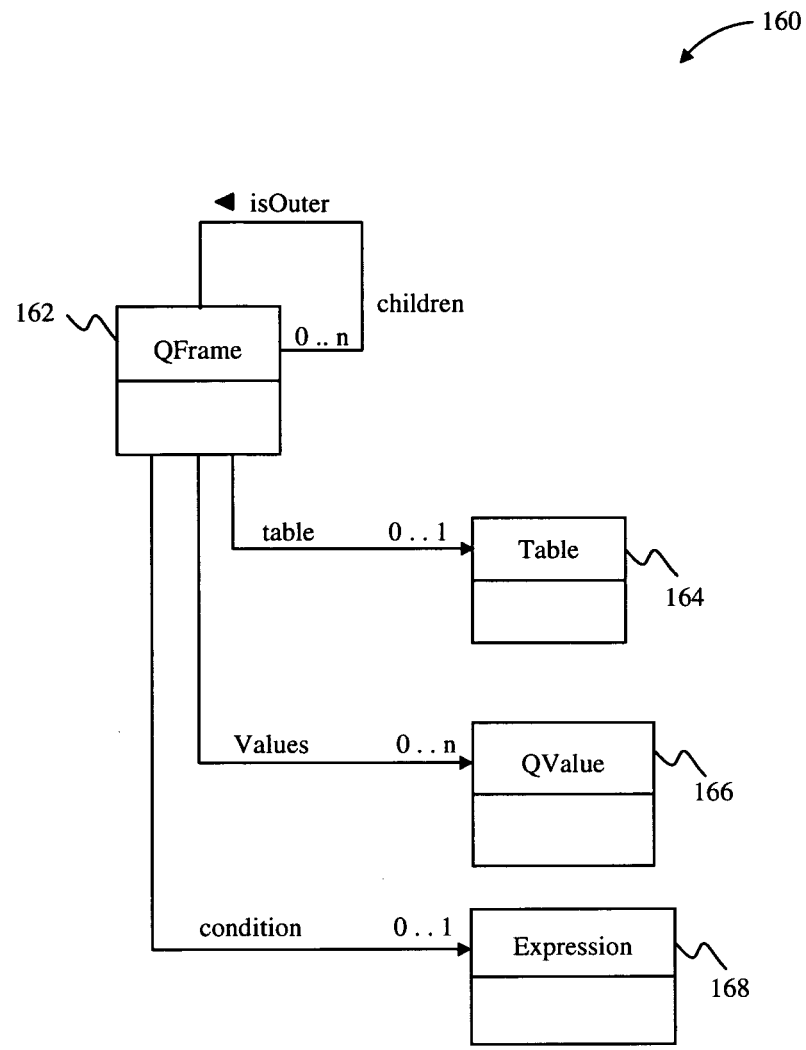
FIG. 8 an object model illustrating an exemplary QFrame object that can be used during optimization of certain queries according to one or more embodiments of the present invention.

According to one or more embodiments of the present invention, data structures and/or objects can be created to correspond to various operations that can be performed on the RDBMS when optimizing queries. Referring additionally to FIG. 8, an object model 160 of a QFrame object 162 that can be used during the optimization process is illustrated. For example, the QFrame object 162 can corresponds to a relational query, whereas any child QFrame object would represent join operations for combining the columns of multiple tables. Each QFrame object 162 can have a multiplicity of child QFrame objects. Furthermore, the QFrame 162 can include a link attribute for each child QFrame. The link attribute can be used to maintain and/or modify information corresponding to a child QFrame such as, for example, whether the child QFrame is an outer join. An outer join is a method for intentionally retrieving selected rows from one table that don't match rows in another table. Each QFrame 162 can also include a table 164 and an expression object 168. The QFrame 162 can also include a number of QValue objects 166, wherein each QValue object 166 corresponds to a native column or a column derived expression. In the event that the QFrame objects are nested (i.e., describe nested joins), the nested objects would also include a pointer to their containing QFrame. According to one or more embodiments of the present invention, QFrames are initialized and associated with expressions as the semantic analysis is being performed.

Returning to FIG. 7A, any subqueries in the expression tree are identified at step 358. At step 360, all identified subqueries are converted into join operations. If QFrames are used, for example, then QFrames representing primitive tables are identified. If any unique key in these tables is determined to be constrained, that is, equivalent to an expression that is constant, then the QFrame is hoisted to its containing QFrame. An expression is constant when it is a literal or when it depends only on values from containing QFrames. This operation can be performed, for example, by a fixed-point algorithm until there are no more QFrames to hoist. For example, consider the following QFrames:

qframe1:
        table=employees
        values=employee_id
        condition=exists(supervisor)
    qframe2:
        table=employees
        values=employee_id
        condition=supervisor_id==qframe1.employee_id The qframe1.employee_id variable is constant relative to qframe2, i.e., for each row in the subquery represented by qframe2, qframe1.employee_id has the same value. Also employee_id is a unique key in the EMPLOYEES table so qframe1 can be made a child of qframe1, as follows:

qframe1:
        table=employees
        values=employee_id
        condition=exists(supervisor)
        children=
        (outer) qframe2:
        table=employees
        values=employee_id
        condition=supervisor_id==qframe1.employee_id At step 362, any joins that have been unnecessarily categorized as outer joins in the query are identified. Such (unnecessarily categorized) outer joins can correspond, for example, to joins that are performed on a foreign key that is never null (i.e., will always contain values). At step 364, all outer joins are converted to inner joins. This can be accomplished, for example, by changing the "isOuter" attribute of the QFrame. According to one or more embodiments of the invention, such conversions can improve operations because outer joins in a relational query can impair the RDBMS' ability to optimize execution. An outer join will only be converted to an inner join if it will not change the outcome of the query. In an outer joins, some values can be null. However, if the query contains additional constraints that mandate those values will not be null, then an inner and outer join will be equivalent. Thus, the outer join can be converted to an inner join.

As previously indicated, unnecessary outer joins can be identified based on non-nullable attributes of certain columns. Thus, columns having such attributes will always result in a table with values, and the join operation will not fail. According to embodiments of the invention that utilize QFrames objects, a QFrame that is outer with respect to its parent and is constrained by a foreign key, or series of foreign keys, to the values on which its condition depends is made a child of the parent QFrame of its dependent values. This is illustrated below:

qframe1:
        table=employees
        values=employee_id
        condition=<none>
    qframe2:
        table=employees
        values=employee_id
        condition=supervisor_id==qframe1.employee_id Supervisor_id has a foreign key to employee_id. Therefore, qframe1 can be represented as follows:

qframe1:
        table=employees
        values=employee_id
        condition=<none>
        children=
        qframe2:
            table=employees
            values=employee_id
            condition=supervisor_id==qframe1.employee_id At step 366, a partition table is created for each variable. If QFrames are used, then they are first initialized with an equiset and a set of non null values. The equiset is a data structure for partitioning values into equivalence sets based on equality assertions. More particularly, variables are grouped into partitions such that all variables within a partition are equivalent. At step 368, equivalent partitions are merged into one. Thus, if the partition table contains ten partitions, and variable one (or qframe1) is determined to be equivalent to variable ten (or qframe10), then partitions one and ten can be merged into partition one which contains both variables one and ten (or qframe1 and qframe10). This process could be repeated until all equivalent partitions have been merged.

Figure 7B:
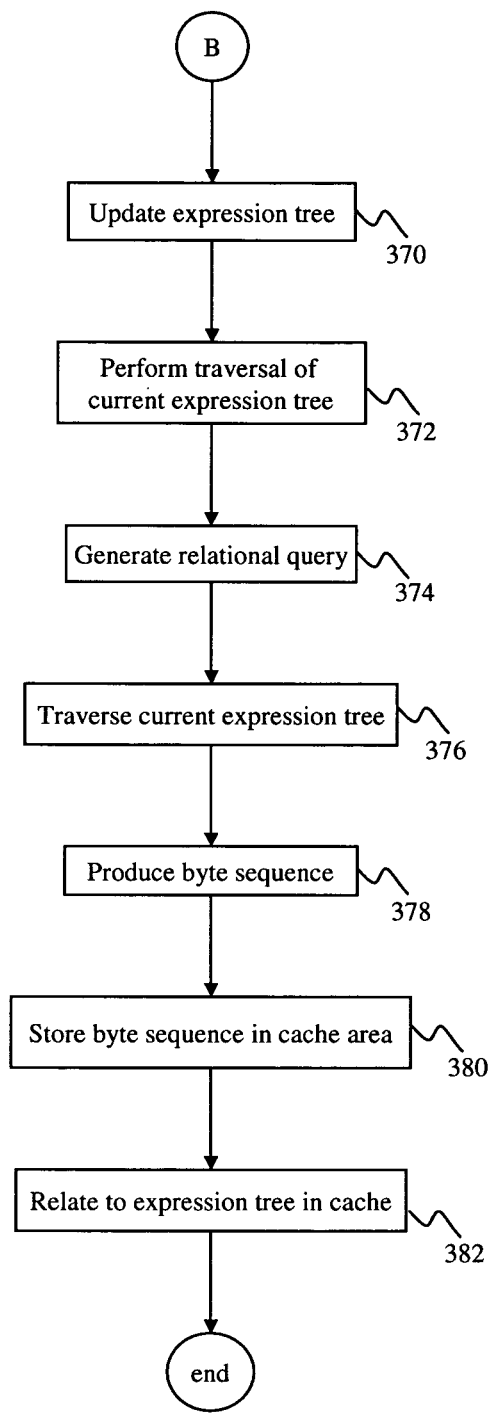

Referring to FIG. 7B, once the partitions have been merged, the expression tree is updated at step 370. At step 372, a traversal is performed for the updated expression tree. During the traversal, each QFrame is examined beginning with the top QFrame and descending to its children QFrames. Each QFrame can correspond to a SQL join (inner or outer) or a subquery. The values and conditions of the QFrame are rendered as the selected values and the constraints in the relational query. Depending on the particular expression tree, some special handling may be required for the top-level QFrame. At step 374, the relational query is produced based on the current expression tree, which includes the optimization previously performed. At this point, the relational query can be applied to the RDBMS in order to retrieve data which satisfies the original object query.

According to one or more embodiments of the present invention, after the relational query is generated, another traversal can be performed on the current expression tree at step 376 to further improve optimization of the present invention. A unique byte sequence is produced at step 378 based on this traversal. The byte sequence can be used, for example, to produce a hash key. At step 380, the byte sequence is stored in a cache area. At step 382, the byte sequence is used as a key in the cache and is associated a relational query corresponding to the expression tree that has been optimized. The process then ends. Thus, for example, the byte sequence can be used at step 352 to determine if a cached expression tree exists. If a cached expression tree exists, there is no need to perform any query optimization. The relational query can be generated based on the cached expression tree, which is already optimized.

Figure 9A:
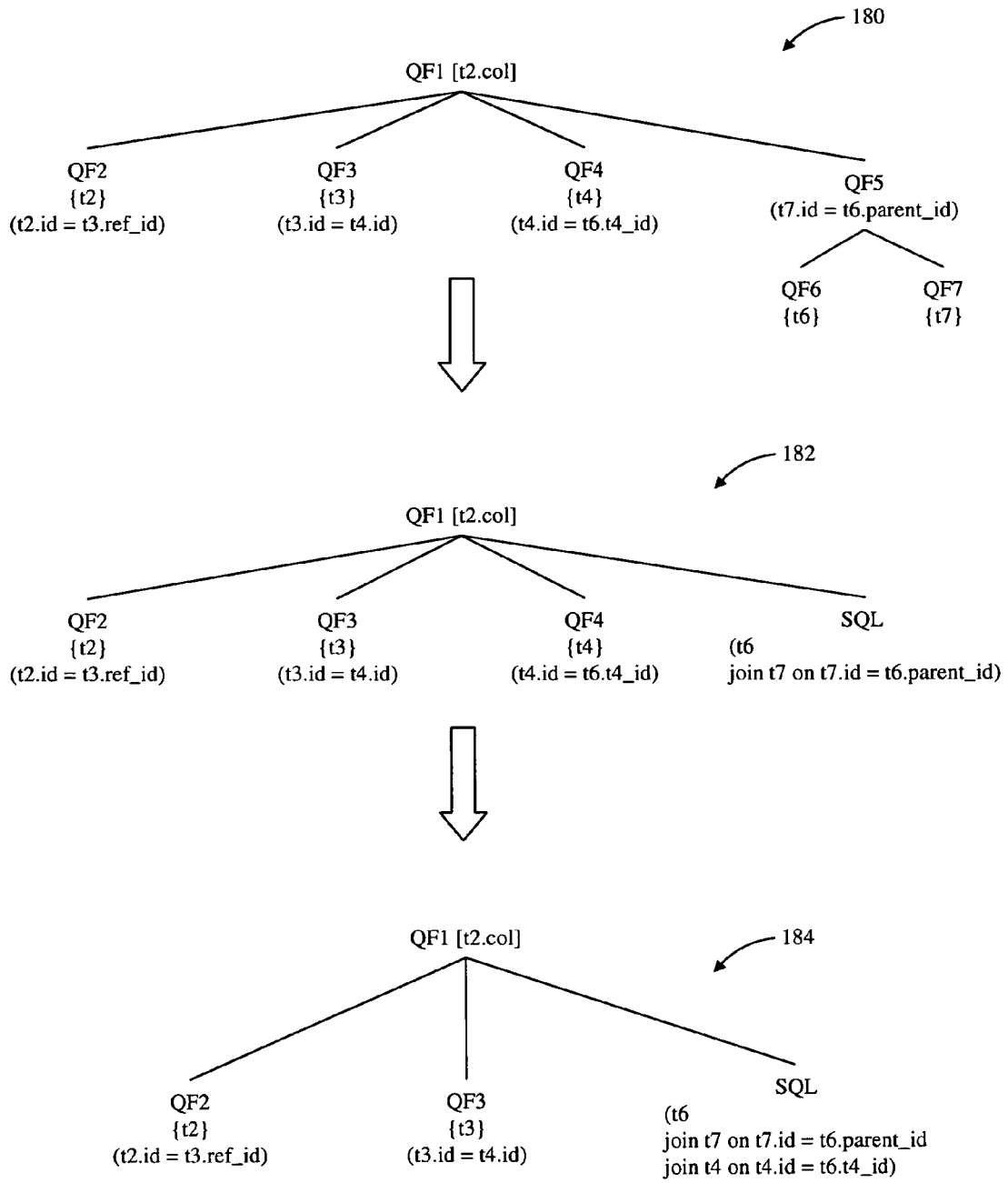
FIGS. 9A and 9B illustrate transformation of tree of QFrames into an SQL statement according to one or more embodiments of the present invention.
Figure 9B:
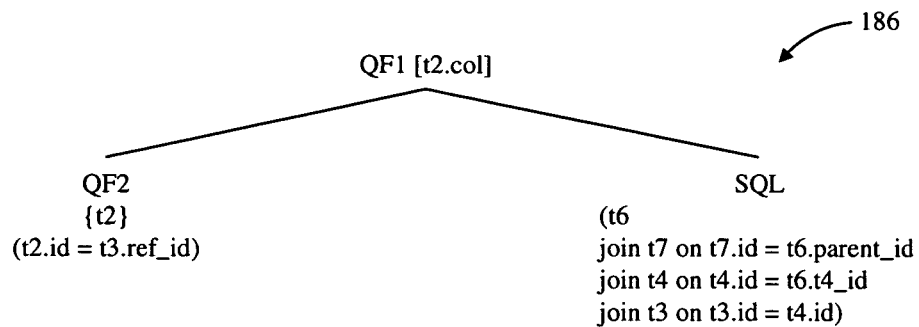
Figure 9B:
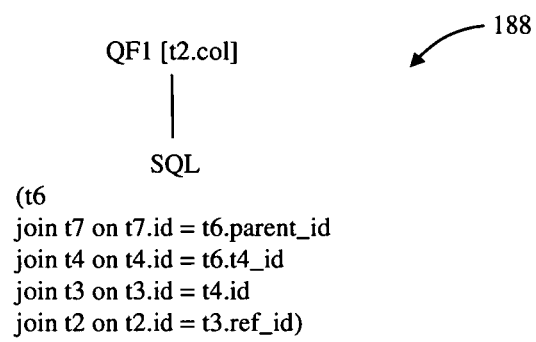
Figure 9B:
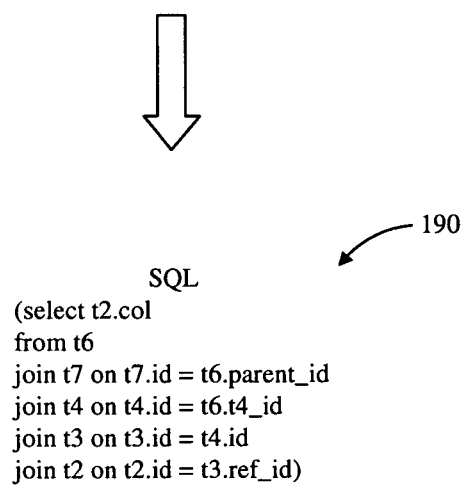

FIGS. 9A and 9B illustrate transformation of an expression tree of QFrames into an SQL statement according to one or more embodiments of the present invention. The expression tree is represented in its original form at 180. There are four leaf nodes stemming from QF1, namely QF2, QF3, QF4, and QF5. In addition, QF5 also includes two leaf nodes, QF6 and QF7. SQL fragments are built up the tree starting at the orphan leaf nodes and progressing upward. Each SQL fragment can represent a table, table expression, or join operation. Accordingly, a SQL fragment is first created for the QF6 and QF7 leaf nodes and combined with the condition of QF5 to produce a join operation at 182. At 184, QF4 is transformed and replaced by a SQL fragment, which is added to the SQL fragment created at 182. At 186, QF3 is transformed and replaced with a SQL fragment. The fragment is again added to the previously created fragments. At 188, QF2 is transformed and replaced by a SQL fragment. Finally, at 190, the root node (QF1) is transformed into a SQL fragment. The combined SQL fragments correspond to the SQL statement represented by the tree.

Figure 10:
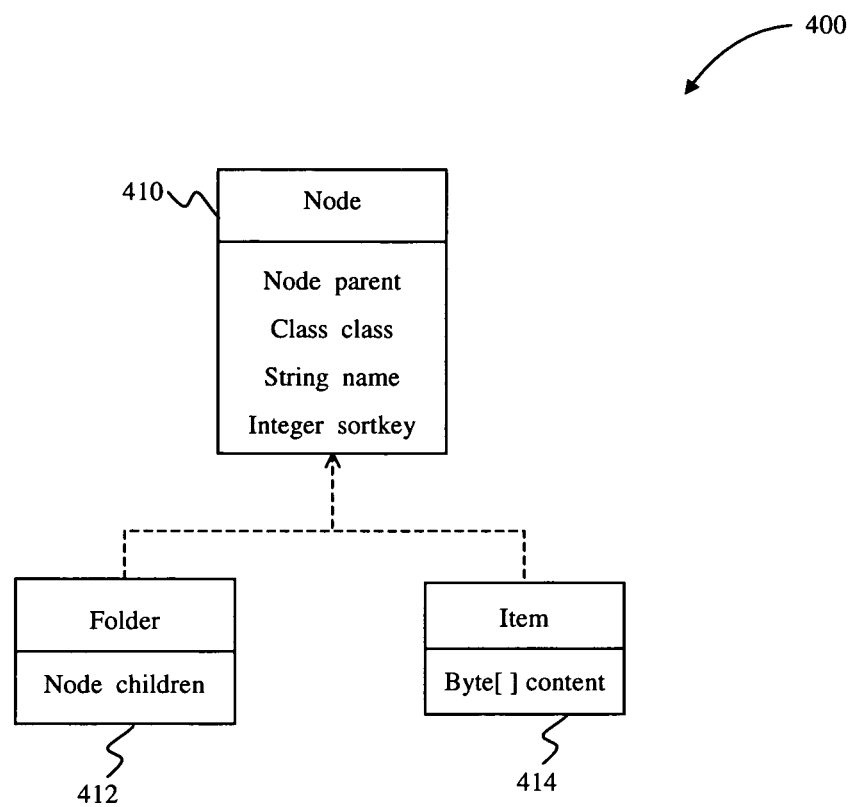
FIG. 10 is a diagram illustrating an object model for an exemplary system which utilizes some of the features in one or more embodiments of the present invention.
Figure 10:
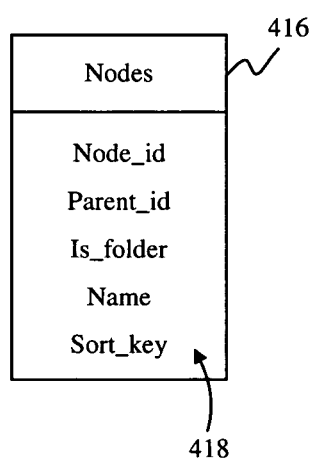

FIG. 10 illustrates an exemplary object model 400 that can be used in an object-oriented environment such as, for example, a content management system. The object model 400 defines a node object 410 with certain attributes such as parent, class, name, and sortkey. Two types of node objects can extend the parent node. Folders 412 can contain other nodes, while items 414 cannot contain other nodes. Items 414 have a content field and folders 412 have a children field. Folders 412 and items 414 both share a sort key, by virtue of extending the node object 410, that can be used to determine their order within the parent folder.

FIG. 10 also illustrates an exemplary table model 416 to which the objects would be mapped. More particularly, the Nodes table 416 includes a plurality of columns 418 that can be used to store certain attributes of the object model 400. As previously discussed, it is not always possible to map all the attributes in an object model to a physical model (or tables). For example, in the example in FIG. 10, the children association is not present in the columns 418 of table 416. This represents a derived association because the children association is the logical inverse of the parent association.

Figure 12:
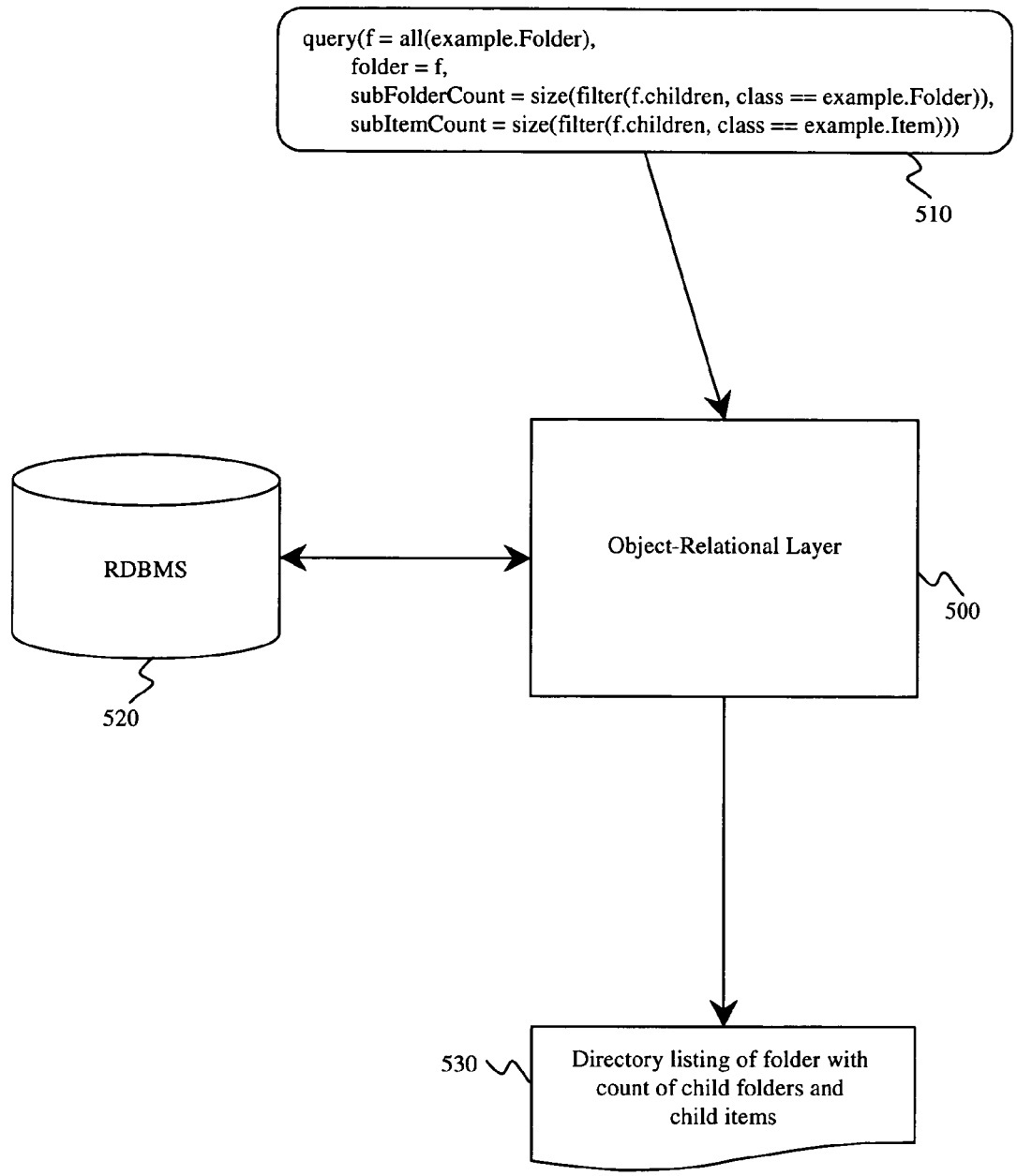
FIG. 12 is a diagram illustrating a prior art system for processing queries on the model of FIG. 10 according to conventional methods.
Figure 13:
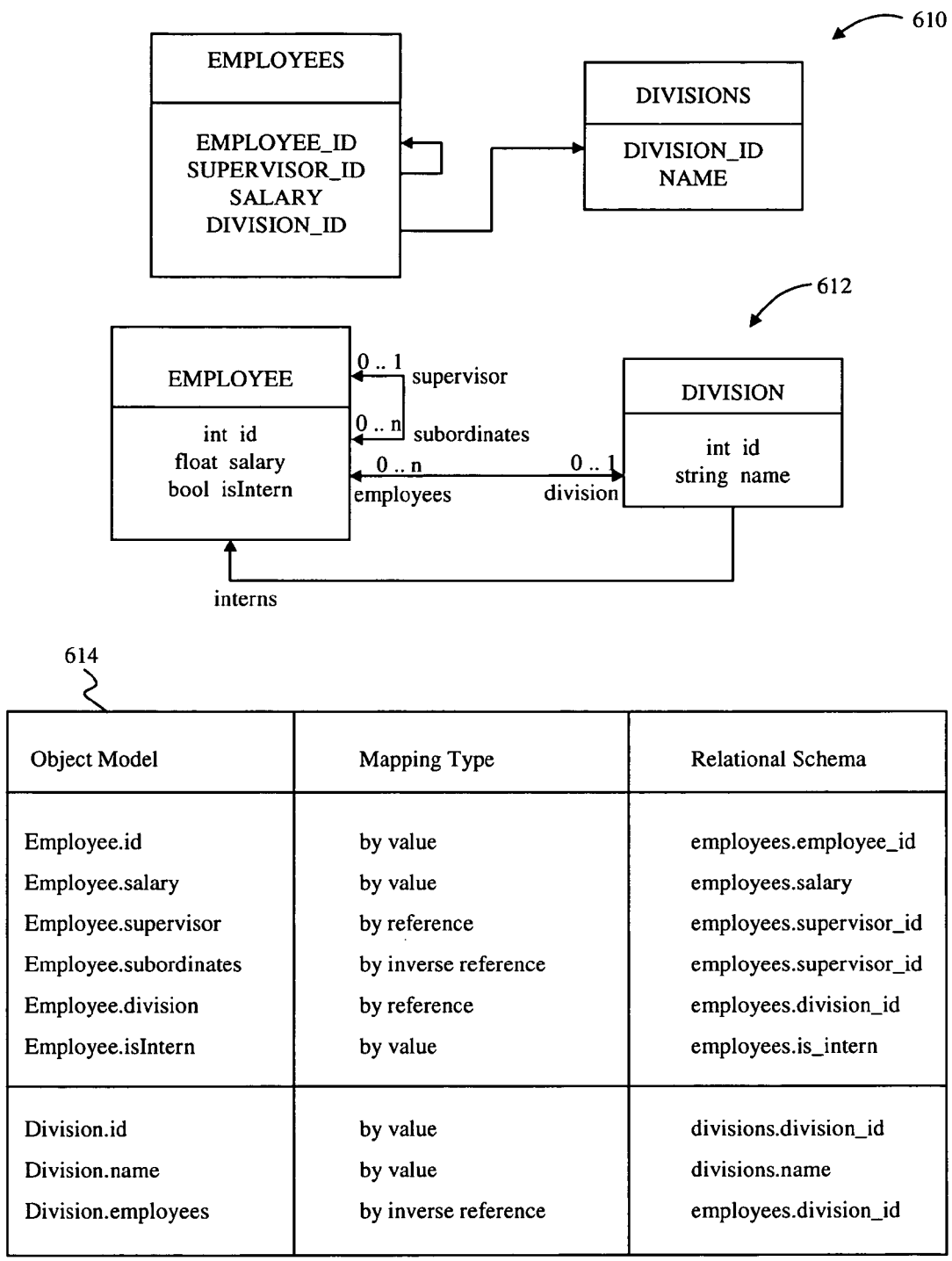
FIG. 13 is a diagram illustrating an object model and the corresponding translation rules for mapping objects to an RDBMS according to conventional methodologies.

During normal operation, the content management system may require information that must be retrieved from the RDBMS. For example, the content management system may be required to produce a directory listing of a folder along with a count of the child folders and child items for a particular folder. Referring to FIG. 12, conventional methodologies would apply a query to the RDBMS similar to the following:

query(f=all(example.Folder),
    folder=f,
    subFolderCount=size(filter(f.children,
        class==example.Folder)),
    subItemCount=size(filter(f.children,
        class==example.Item)))

Conventionally, such a query 510 would be submitted to the object relational layer 500. The object relational layer 500 would perform appropriate mappings and translations based on existing metadata, and query the RDBMS 520 in order to identify data that satisfies the query. The object relational layer would then produce a directory listing 530 of the folder with the count of child folders and child items.

Figure 11:
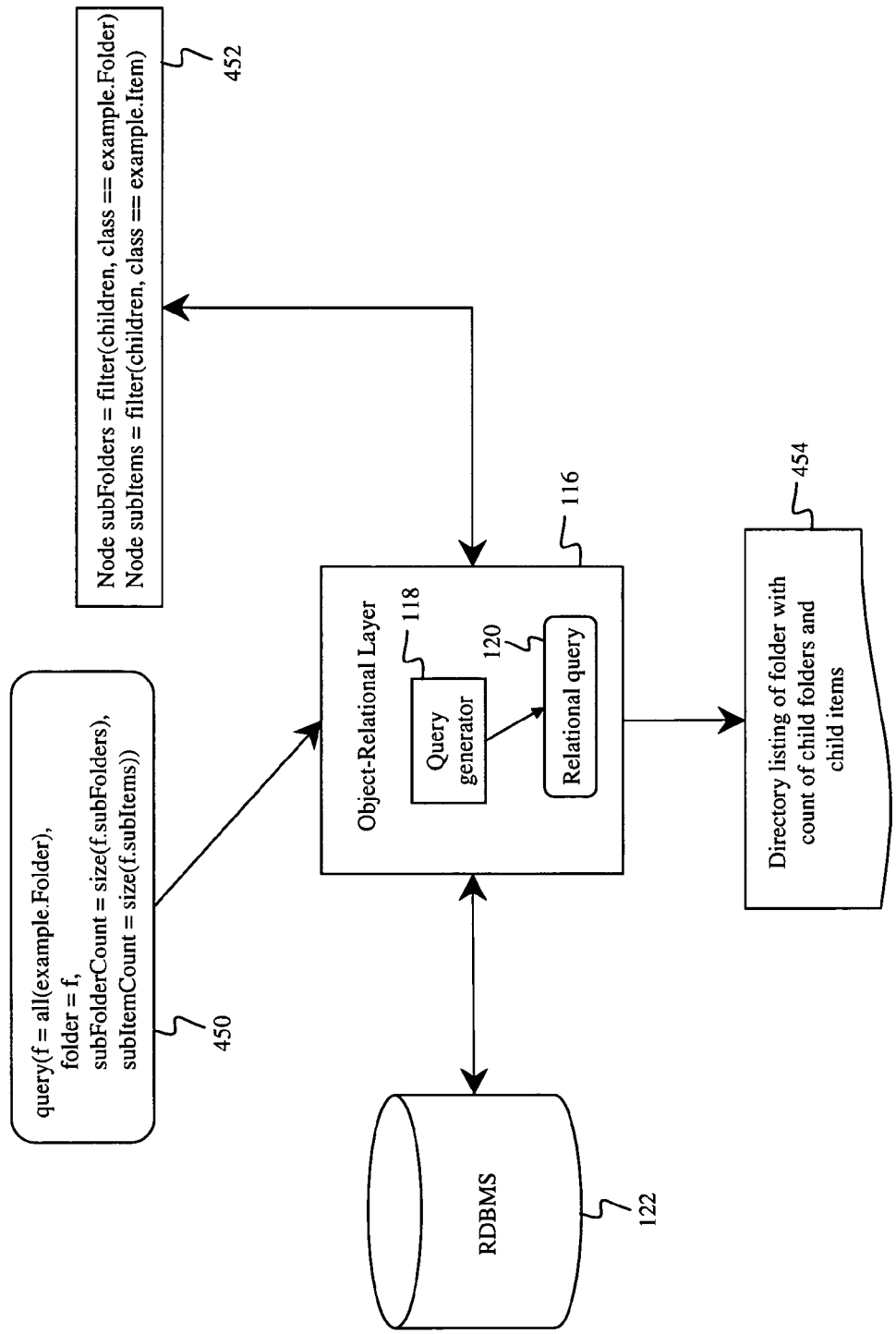
FIG. 11 is a diagram illustrating a system for processing queries on the model of FIG. 10 according to one or more embodiments of the present invention.

Referring to FIG. 11, a block diagram illustrates how such a query would be performed according to one or more embodiments of the present invention. Rather than performing such a relational query, the query generator of the present invention receives a logically derived definition 452 of subfolders and subitems. Optionally, the query generator can create such a logically derived definition based on the translation rules, as previously discussed. Thus, the application user interface would submit a query such as query 450. The object relational layer would utilize the existing mapping metadata and the developer metadata to generate a relational query based on the object query 450. The relational query would then be submitted to the RDBMS 122 in order to retrieve the directory listing of the folders with the count of child folders and child items 454. According to one or more embodiments of the present invention, the resulting relational query can enhance user productivity. For example, construction a relational query for a particular RDBMS, requires knowledge the specifics of its relational query system. By having a query generator, the knowledge of RDBMS specifics is encoded in the query generation process. The developer only needs to learn the OQL, instead of the specific details of each RDBMS. The present invention can also allow developers to change the relational schema without having to change the actual queries, which are written in OQL. By changing only the metadata, the generated relational queries will work with the updated relational schema. This can reduce the amount of time necessary to change/update the RDBMS because there are likely many, many queries, but there is only one set of metadata. As can be seen, the object query 450 of the present invention operates at a higher level and is capable of maintaining greater data abstraction than the conventional query shown in FIG. 12.

Consider, for example, a user who is creating an organizational directory system. The persistent model for such a system would usually be centered around a primary entity such as a User or Employee type. The specific attributes associated with this primary type can vary from one implementation to the next. For the sake of simplicity, assume that the model starts with the following type definition.

```
object type User {
    // a system wide unique id
    Integer id;
    // the name of the user
    String name;
    // the email address of the user
    String email;
```

-continued

```
        // the address of the user
        Address address;
}
```

Suppose version one of this directory system is based on the previous persistent model. The directory system could also include a navigation application with an extensive number of query and navigation pages that allow searching and browsing through users by id, name, email, and address. These pages would necessarily contain a number of OQL queries distributed across thousands of lines of program code that reference the id, name, email, and address fields of the model.

In version two of the directory system, it becomes necessary to store multiple email addresses for each user. This requires a basic change to the persistent model:

```
object type User {
        // a system wide unique id
        Integer id;
        // the name of the user
        String name;
        // the emails of the user
        List<String> emails;
        // the address of the user
        Address address;
}
```

This second persistent model is incompatible with the version one model in several respects. Any query referencing the "email" field of the User type will not work since that field no longer exists. Even if this problem were circumvented by renaming the "emails" field in this new model back to "email", these queries and the code surrounding them would still not function correctly because they would be expecting a field of type "String", not "List<String>". Consequently, much of the application code would need to be rewritten to conform to the new persistent model in order to support this new feature.

According to one or more embodiments, the present invention provides a unique way to reduce the development costs associated with making various changes to the persistent model of an application. The present invention allows creation of a persistent model with the additional capabilities of the second persistent model, while being backward compatible with the version one persistent model. According to one or more embodiments of the present invention, the new persistent model can be defined as:

```
object type User {
        // a system wide unique id
        Integer id;
        // the name of the user
        String name;
        // a query that chooses the first email as the default one
        String email = {
            filter(emails, index = 0);
        }
        // the email of the user
        List<String> emails;
        // the address of the user
        Address address;
}
```

Since this new persistent model is backward compatible with the old one, thousands of lines of code would remain untouched and continue to function in version two of the directory system.

According to such a persistent model, the default email is always the first in the list. Suppose, however, that users of the system found this feature confusing and/or limiting. Version three of the directory system is now required to provide a default email that is selectable independent of the order in which emails are added. According to one or more embodiments of the invention, the persistent model can be modified to produce a third version, as follows:

```
object type User {
        // a system wide unique id
        Integer id;
        // the name of the user
        String name;
        // email entries
        Set<EmailEntry> emailEntries;
        // choose the default email
        String email = {
            filter(emailEntries, isDefault = true);
        }
        // list of emails from version two
        List<String> emails = { emailEntries.email };
}
object type EmailEntry {
        String email;
        boolean isDefault;
}
```

In version three of the persistent model, the definition of the email attribute has been modified to allow selection of the default email based on a flag rather than the list index. According to such embodiments, backward compatibility can be maintained by redefining the "emails" field in terms of the new emailEntries field. The development costs associated with making such changes to the directory system can be reduced because program code that depends on both the "email" and "emails" fields will continue to function, while the new definition of default email will also be adopted. This would also be accomplished without any changes to the program code itself.

In order to emphasize some of the benefits of the present invention, the foregoing examples have been limited to a few isolated changes to a comparably small and simple piece of software involving only a few persistent types and a few thousand lines of code. These benefits become increasingly valuable within the context of full-scale, real-world applications where each version of the software can involve numerous such changes. Further, such changes can easily effect hundreds of thousands of lines of code. In such circumstances, it can be difficult to determine the cost associated with making the changes because it must first be determined which of the hundreds of thousands of lines of code will be effected and what repercussions the change may have on the stability of the system.

The foregoing embodiments have been provided by way of explanation of the invention, which is not intended to be limited thereto. In fact, those of ordinary skill in the art will appreciate, upon reading the present specification and viewing the present drawings, that various modifications and variations can be made. For example, features illustrated or described as part of one embodiment can be used on other embodiments to yield a still further embodiment. Additionally, certain features may be interchanged with similar devices or features not mentioned yet which perform the same or similar functions. Furthermore, the present invention can be implemented on various computer systems and/or servers using any operating system including, Windows, MacOS, Unix, Linux, etc., and can be applied to any programming language. It is therefore intended that such modifications and variations are included within the totality of the present invention.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A method of generating a relational query for retrieving data from a relational database management system comprising:
   receiving, from an object-oriented environment including at least one object model that identifies a set of data objects, an object query containing at least one logical object description in an expression language having predetermined constructs and corresponding developer meta data, wherein the at least one logical object description includes mapping definitions for corresponding object attributes which do not map directly to a column in a database table in a relational database management system (RDBMS) and wherein the corresponding developer meta data includes translation rules written in the expression language that are used to convert the at least one logical object description to corresponding logical relations in the RDBMS;
   retrieving, from a mapping schema stored in an object relational layer, mappin meta data including (i) object-to-relational mapping information, and (ii) object-to-object mapping information that corresponds to the object query, wherein the mapping meta data describes relationships between objects defined in one or more of the at least one object model and database tables in the RDBMS;
   determining whether one or more of the at least one logical object description are received more than a predetermined number of times within a time period and, if so determined, generating new instances of object-to-object mapping information based on the one or more of the at least one logical description to add the new instances to the mapping meta data; and
   translating the object query to an equivalent relational query using the mapping meta data and the developer meta data for retrieving data from the relational database management system to satisfy the object query.

2. The method of claim 1, wherein retrieving mapping information further comprises:
   accessing the developer metadata contained in the object and the relational mapping schema stored in the object relational layer; and
   parsing the developer metadata to identify the translation rules.

3. The method of claim 2, further comprising:
   defining new aspects of the object model in terms of object to object mapping definitions contained in at least one of the developer metadata and the relational mapping schema; and
   storing the new aspects of the object model with the mapping schema.

4. The method of claim 3, wherein the new aspects of the object model are logically derived associations.

5. The method of claim 4, further comprising defining the new aspects of the object model in terms of logically derived associations that have been previously defined.

6. The method of claim 5, further comprising identifying logically derived associations that are self-dependent.

7. The method of claim 6, wherein identifying logically derived associations further comprises:
   creating a stack for storing logically derived associations;
   upon encountering a logically derived association in the metadata file, searching the stack for any occurrences of the logically derived association;
   if no occurrence of the logically derived association is found in the stack, then pushing the logically derived association onto the stack; and
   if the newly defined logically derived association is present in the stack, then generating an error.

8. The method of claim 7, further comprising if no occurrence of the logically derived association is found, then:
   determining if the logically derived association is defined using another logically derived association; and
   if the logically derived association is defined using another logically derived association then:
      identifying the logically derived association used in the definition, and
      then searching the stack for the logically derived association used in the definition.

9. The method of claim 7, further comprising if an error is generated, then:
   examining all intervening entries in the stack between the two occurrences of the logically derived association; and
   identifying intervening entries that are potentially responsible for the error.

10. The method of claim 1, further comprising optimizing the relational query.

11. The method of claim 10, wherein optimizing the relational query comprises:
    parsing the object query into an expression tree; and
    performing a semantic analysis of the expression tree.

12. The method of claim 11, wherein performing a semantic analysis comprises:
    determining a type for each expression in the expression tree; and
    identifying dependencies in variables contained in each expression.

13. The method of claim 12, further comprising identifying nullable and non-nullable expressions.

14. The method of claim 13, further comprising identifying conditions, within the expressions, that contain equality constraints.

15. The method of claim 14, wherein identifying conditions further comprises identifying conditions that are completely described by a set of equality constraints.

16. The method of claim 10, further comprising:
    identifying subqueries in the expression tree; and
    converting any identified subqueries into corresponding join operations.

17. The method of claim 16, further comprising:
    identifying unnecessary outer join operations in the expression tree; and
    converting each unnecessary outer join operation into an inner join operation.

18. The method of claim 17, further comprising:
    creating a partition for each variable in the expression tree;
    identifying equivalent variables in the expression tree; and
    merging partitions containing equivalent variables.

19. The method of claim 18, further comprising determining if any remaining partitions contain non-null unique keys.

20. The method of claim 19, wherein generating a relational query comprises:
performing a traversal of the current expression tree; and
generating the relational query based on the current expression tree.

21. The method of claim 20, further comprising caching the current expression tree created for relational queries generated.

22. The method of claim 21, wherein the caching the expression tree comprises:
traversing the current expression tree;
producing a unique byte sequence corresponding to the expression tree; and
storing the byte sequence in a cache area;
wherein the byte sequence is not affected by semantically identical expressions.

23. The method of claim 21, wherein optimizing the relational query comprises:
determining whether an entry for the expression tree exists in the cache area for the current object query; and
if the cache area contains an entry for the expression tree, then generating the relational query based on the expression tree.

24. A computer-based system for generating a relational query for interfacing an object-oriented environment to a relational database management system (RDBMS) comprising:
one or more physical computer systems executing instructions to generate an object relational layer in communication with said object-oriented environment and said relational database management system (RDBMS), wherein said object-oriented environment includes at least one object model that identifies a set of data objects;
said object relational layer being configured to:
receive an object query from said object-oriented environment, the object query containing at least one logical object description in an expression language having predetermined constructs and corresponding developer meta data, wherein the at least one logical object description includes mapping definitions for corresponding object attributes which do not map directly to a column in a database table in the relational database management system (RDBMS) and wherein the corresponding developer meta data includes translation rules written the expression language that are used to convert the at least one logical object description to corresponding logical relations in the RDBMS;
retrieve, from a mapping schema, mapping meta data including (i) object-to-relational mapping information, and (ii) object-to-object mapping information that corresponds to the object query, wherein the wrapping meta data describes relationships between objects defined in one or of the at least one object model and database tables in the RDBMS;
determine whether one or more of the at least one logical object description are received more than predetermined number of times within a time period and, if so determined, generate new instances of object-to-object mapping information based on the one or more of the at least one logical description to add the new instances to the mapping meta data; and
translate the object query to an equivalent relational query using the mapping meta data and the developer meta data for retrieving data from the relational database management system to satisfy said object query.

25. A computer program product, residing on a non-transitory computer-readable medium, for use in interfacing an object-oriented environment to a relational database management system, said computer program product comprising instructions for causing a computer system to:
receive an object query from said object-oriented environment, the object query containing at least one logical object description in an expression language having predetermined constructs and corresponding developer meta data, wherein the at least one logical object description includes mapping definitions for corresponding object attributes which do not map directly to a column in a database table in the relational database management system (RDBMS) and wherein the corresponding developer meta data includes translation rules written in the expression language that are used to convert the at least one logical object description to corresponding logical relations in the RDBMS;
retrieve, from a mapping schema, mapping meta data including (i) object-to-relational mapping information, and (ii) object-to-object mapping information that corresponds to the object query, wherein the mapping meta data describes relationships between objects defined in one or more of the at least one object model and database tables in the RDBMS;
determine whether one or more of the at least one logical object description are received more than a predetermined number of times within a time period and, if so determined, generate new instances of object-to-object mapping information based on the one or more of the at least one logical description to add the new instances to the mapping meta data; and
translate the object query to an equivalent relational query using the mapping meta data and the developer meta data for retrieving data from the relational database management system to satisfy said object query.

* * * * *